United States Patent Office 2,912,142
Patented Nov. 10, 1959

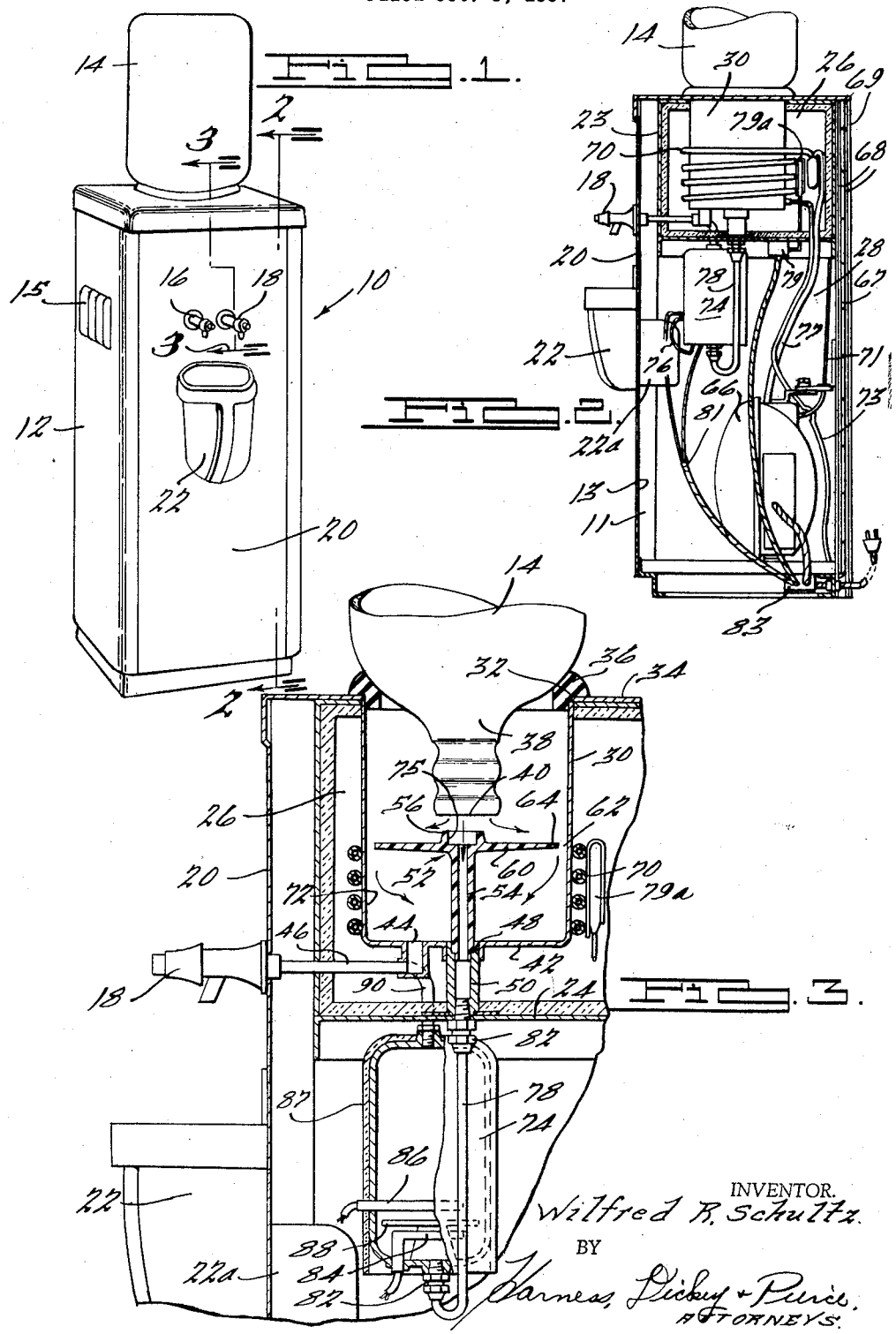

2,912,142

COMBINED HOT AND COLD FLUID DISPENSING APPARATUS

Wilfred R. Schultz, Troy, Mich., assignor to Temprite Products Corporation

Application October 9, 1957, Serial No. 689,238

6 Claims. (Cl. 222—129)

This invention relates to a machine for preparing and dispensing hot and cold water or other similar fluid.

It has become desirable to combine with refrigerated water coolers used in offices, factories and other similar places, apparatus for heating and dispensing hot water suitable for making coffee or tea or for other similar uses. The principal object of this invention, therefore, is to provide in combination with a conventional type refrigerating water dispenser and without enlarging the cabinet or space requirement therefor, efficient water heating and dispensing means, wherein the conventional normal temperature-level controlled water supply means for the refrigerating dispenser is made available by means applied within the refrigerating container to constantly supply substantially normal temperature water also to a water heating and dispensing means without substantial loss of heating or refrigerating efficiency through heat interchange between the water refrigerating and the water heating sections of the apparatus, and wherein to insure against destructive overheating, provision is also made for always retaining a substantial quantity of water in the water heating container, despite failure or depletion of the common water supply and despite withdrawal of all refrigerated water.

A further object of this invention is to provide a hot and cold water dispenser which is simple in construction, economical to manufacture, and efficient and safe in operation for providing and dispensing both hot and refrigerated water from a common normal temperature water supply.

Further objects, features and advantages of this invention will become apparent from a consideration of the following description, the appended claims and the accompanying drawing in which:

Fig. 1 is a perspective view of the dispenser of this invention;

Fig. 2 is a sectional view looking substantially along the line 2—2 in Fig. 1; and Fig. 3 is an enlarged fragmentary sectional view looking along the line 3—3 in Fig. 1.

With reference to the drawing, the dispenser of this invention, indicated generally at 10, is illustrated in Figs. 1 and 2 as including an upright generally rectangular frame 11 adapted to be floor-supported in an office, factory or the like and provided with an open-back slip-on casing 13 which, together with the frame 11, forms a cabinet 12. A replaceable bottle 14, containing drinking water, is mounted on the upper end of the cabinet 12. A pair of faucets 16 and 18, for hot and refrigerated water, respectively, are mounted in the front wall 20 of the cabinet 12 which has side air outlet vents 15. Disposed below the faucets 16 and 18 is a waste basin 22 which may communicate with a suitable drain. A heat insulating box 23 having a horizontal bottom wall 24 divides the interior of the cabinet into an upper heat insulating chamber 26 within the box 23 and a lower chamber 28 located outside the box.

A water supply and refrigerating container 30 (Fig. 3) is mounted in the upper chamber 26 and has an open upper end 32 which is at the level of the top surface 34 of the cabinet 12. A gasket and support member 36, formed of a resilient material such as rubber, is mounted in the top panel of cabinet 12 at the upper open end of the container 30 and serves as a support for the bottle 14. In its supported position on the gasket 36, the bottle 14 has its neck portion 38 projected downwardly into the container 30. In this position, the lower or discharge end 40 of the bottle 14 is approximately midway between the upper end 32 of the container 30 and the container bottom wall 42.

A first opening 44 in the bottom wall 42 of container 30 communicates with the faucet 18 for refrigerated water through a line 46. A second opening 48 in the container bottom wall 42 communicates with a downwardly extending brass pipe 50 positioned with its upper end in the opening 48 and terminating at its lower end in an opening in the insulating wall 24.

A baffle and conduit unit or zone defining and conduit means 52, which may be of a unitary construction and is formed of a plastic material of low heat conductivity, is supported in the upper end of the pipe 50 and projects upwardly into the container 30. The unit 52 includes a hollow upright conduit member 54 provided with an enlarged upper or inlet end 56 positioned directly below and adjacent to the bottle discharge end 40. The lower discharge end of the conduit member 54 is telescoped within the pipe 50 for delivering water supplied by the bottle 14 to the pipe 50. The horizontal baffle member 60 of the unit 52 is a flat disc at the upper end 56 of the conduit member 54 and is dimensioned to provide a small clearance 62 for water passage between its outer edges 64 and the wall of container 30.

A conventional refrigerating system is arranged in the cabinet 12. The system includes a hermetically sealed compressor unit 66 (Fig. 2) having a built in motor, a condensing coil 67 connected at its upper end to the unit 66 by a line 71, and an evaporator coil 70. The condensing coil 67 is of the "wire and tube" type having cylindrical wires 68 spot welded or brazed to opposite sides thereof and extending vertically within the casing 13. As shown in Fig. 2, the frame 11 provides a narrow space or chimney at the rear of the cabinet for the coil 67, with this space being open at the rear side of the cabinet. The heat dissipating components of the refrigerating system, i.e., compressor 66 and condenser coil 67, are located in the cabinet 12 outwardly of the insulating box 23. The heat absorbing evaporator coil 70 is supplied with refrigeration by a restrictor tube 73 from the lower end of the condenser coil 67. The evaporator coil 70 is wound about the lower portion 72 (Fig. 3) of the water container 30 in upper chamber 26 and communicates with the unit 66 through a line 77.

A container 74, for heating water and storing the same, is mounted in the lower chamber 28 of the cabinet 12 below the insulating box 23 and adjacent the front wall 20. A pipe 78 connected at one end in the lower end of the container 74 and at its other end to the lower end of pipe 50 at the bottom wall 24 of the insulating box 23 conveys water from pipe 50 to container 74. The connection of pipe 78 to pipe 50 and to container 74 is by means of non-metallic thermo-break connectors 82, of well known construction, to prevent heat transfer from pipe 78 to pipe 50 and from container 74 to pipe 78. Furthermore, the connectors 82 facilitate disconnecting of the pipe 78 for removal of container 74 from the cabinet, for repair and the like, since the container 74 is readily removed from its threaded support on a pipe 90 carried by the cabinet at the upper end of container 74.

A conventional electric heating unit 84, positioned in the container 74 adjacent the lower end of the reservoir, heats and maintains the water in the reservoir at a predetermined temperature under control of a conventional thermosttic element 86 also positioned within the container 74. A horizontal baffle 88 in the container 74 at a position above and adjacent to the heat unit 84 insures a heating of water delivered to the reservoir through the pipe 78 before this water is withdrawn from the top of the container through pipe 90 leading to the faucet 16. The provision of the water inlet for container 74 at the bottom and the water outlet at the top insures a constant supply of water in the container and eliminates the possibility of damage by heating the container 74 while dry.

An insulating jacket 87, formed of fiber glass or the like, is provided on the container 74 for minimizing heat loss from the container. A single wire line 76 connects the heating unit 84 and element 86 and a two-wire line 81, attached at one end to the unit 84 and element 86 is connected by a releasable plug to a junction box 83 at the lower end of the cabinet 12. The line 81 is readily disconnected from the junction box 83 on removal of the container 74.

In use, water flows from the bottle 14 to fill the container 30 to a level closing the discharge opening 40 of the bottle. Atmospheric pressure within the container 30 is maintained by the usual groove (not shown) in the gasket 36 which opens the interior of the upper portion of container 30 to the atmosphere outside the cabinet 12.

The water level in the container 30 will not rise sufficiently to close the discharge opening of bottle 14 and prevent further flow until the hot water container 74 is filled, and the lower portion of container 30 is also filled to a level closing the outlet opening 40 of bottle 14. Withdrawal of hot water from the container 74 through faucet 16 will cause lowering of the water level in container 30 below the outlet 40 of bottle 14. When this occurs, water at a normal room temperature will flow directly from bottle 14 through pipes 54, 50 and 78 to the hot water container 74 to maintain the hot water container 74 in a constantly filled condition. As the pipe 54 is of a low heat conductivity material, the water standing therein while the hot water container 74 is full and during the operating cycle of the dispenser 10 will not be cooled to any material or substantial degree by the refrigerated water in the lower part of the container 30 beneath the baffle 60. Thus a constant supply of unrefrigerated water is assured for the hot water container 74.

When refrigerated water is withdrawn through faucet 18 from the lower and refrigerated part of container 30 beneath the baffle 60, lowering of the water level in container 30 below the outlet opening 40 of bottle 14 will permit normal temperature water to flow from the bottle 14 into the container 30 until the level has again risen to close bottle opening 40. A conventional bellows-operated switch unit 79 is mounted on wall 24 and provided with a temperature responsive bulb unit 79a which is mounted on the coil 70. The switch unit 79 operates, in response to the temperature of the coil 70 and thus the temperature of the fluid in container 30, to start and stop the compressor unit 66 to maintain a pre-set water temperature in the container portion 72. If the next reduction of water level in container 30 is caused by withdrawal from the hot water container 74, the water in container 30 that will immediately flow into the pipes 54, 50 and 78 leading to the hot water container will be that immediately above and adjacent the opening in the upper end of pipe 54 above the baffle 60 which will not have been refrigerated to any material or appreciable extent or degree as it is protected from the refrigerated water beneath the baffle 60 by the baffle and will not have been refrigerated to any material or appreciable degree by conduction from the walls of the container 30, the lower portions of which are in contact with the refrigerator evaporator coil 70.

The upstanding flange 75 surrounding the enlarged inlet opening 56 to pipe 54 further insures that water supplied to water heating container 74 through the pipe system 54, 50, 78 will be taken from a level above the upper surface of baffle 60, thereby minimizing likelihood of refrigerated water adjacent the edges of baffle 60 entering piping 54, 50, 78 leading to the hot water container. There is thus provided a supply source of normal temperature unrefrigerated water which is common both to the refrigerating container and to the water heating container which is made available by the construction and arrangement of the separator conduit member comprising the baffle 60 and pipes 54, 50, in conjunction with container 30. A loose insulation material is usually used to fill the box 23, after assembly of other dispenser parts in the box, to insure the desired insulation of container 30. This arrangement assures maximum efficiency of operation of the refrigeration for the cold water and also maximum efficiency of operation of the heating element for the hot water, and substantially eliminates efficiency reducing heat or cold exchange between the hot and cold water sections of the dispenser.

A rearward extension 22a on the waste basin 22 increases the capacity of the basin and projects through an opening (not shown) in the cabinet wall 20 when the basin is supported on the wall 20. This opening provides a convenient access opening to the interior of the cabinet 12 for thermostat adjustment.

Instead of using the bottled water or supply as specifically shown and described, tap or main water could be used by introducing the same into container 30 through an outlet of similar form, construction and position as the outlet 40 of the bottle 14 delivering directly over the center of the baffle 60 and above the opening to the inlet piping system 54, 50, 78 for the hot water container, and the flow of inlet water could be controlled by a conventional float in the container 30 controlling a conventional valve in the piping leading from the tap or water main.

It will be understood that the specific constructions of the improved hot and cold water or similar fluid dispenser which are herein disclosed and described are presented for purposes of explanation and illustration and are not intended to indicate limits of the invention, the scope of which is defined by the following claims.

What is claimed is:

1. A hot and cold water dispensing unit comprising a cabinet member having a water supply and refrigerating container in the upper portion thereof, a water heating and storage container in the lower portion thereof, a separator and conduit means within said supply and refrigerating container having a horizontal baffle portion formed of a material of low heat conductivity and dividing the space in said container into communicating horizontally disposed zones comprising a lower zone for refrigerated water and an upper zone for unrefrigerated supply water, said separator and conduit means having also a conduit formed of a material of low heat conductivity and leading from said unrefrigerated supply zone above said baffle portion through said refrigerating zone to a water inlet connection with the lower portion of said water heating container whereby unrefrigerated water is conducted from the unrefrigerated supply zone through said refrigerating zone of said upper container to said lower water heating container, separate adjacent means accessible at the exterior of said cabinet for withdrawing refrigerated water from the lower refrigerated portion of said upper water supply and refrigerating container and for withdrawing heated water from the upper portion of said water heating container, heating means and thermally responsive control means therefore for said heating container, refrigerating means and thermally responsive control means therefor for said refrigerating container, the heat dissipating portion of said refrigerating means being spaced from said refrigerating container and the heat absorbing portion thereof positioned adjacent and in refrigerating relation with said refrigerating container, non-heat conducting wall means in said cabinet separating said heat absorbing and dissipating portions, water supply means for delivering water to said upper supply and refrigerating container above the baffle portion of said separator conduit means controllable by the water level in said upper container, the outlet of said water supply means being positioned directly above the inlet end of the conduit portion of said separator conduit means leading to said water heating container, and the baffle portion of said separator conduit means being supported in the said zone dividing position in said upper supply and refrigerating container by the conduit portion thereof.

2. In a fluid dispensing unit which includes a first reservoir, fluid supply means having a discharge portion terminating in said reservoir at a position above the lower end thereof, means for cooling fluid in said reservoir between said lower end and said discharge portion, a second reservoir, heating means for heating fluid in said second reservoir, conduit means connected to and extending between said reservoirs for delivering fluid to be heated to said second reservoir, said conduit means extending upwardly in said first reservoir and terminating adjacent said discharge portion for receiving fluid directly therefrom, and baffle means on said conduit means adjacent said discharge portion.

3. In a fluid dispensing unit which includes a cabinet, a first reservoir in said cabinet, fluid supply means having a downwardly directed discharge portion located in said reservoir, means located below said discharge portion and associated with said first reservoir for cooling fluid therein, said fluid supply means being arranged for discharging fluid into said reservoir in response to a lowering of the fluid level therein below said discharge portion, conduit means supported on and extending upwardly in said reservoir and terminating at a position directly below and adjacent to said discharge portion, a second reservoir in said cabinet in fluid communication with said conduit means, means for heating fluid in said second reservoir, and a baffle member formed as an integral part of said conduit means and disposed in said first reservoir at a position adjacent said discharge portion for substantially separating the cooled fluid therebelow from the uncooled fluid thereabove.

4. A hot and cold water dispensing unit comprising a cabinet member having in combination therein a water supply and refrigerating container in the upper portion of said cabinet, a water heating and storage container in the lower portion of said cabinet, a zone-defining and conduit means formed of a material of low heat conductivity and located within said supply and refrigerating container having a horizontal baffle portion so as to divide the space in said container into communicating horizontally disposed zones comprising a lower zone for refrigerated water and an upper zone for unrefrigerated supply water, said conduit means leading from said unrefrigerated supply zone above said baffle portion through said refrigerating zone to connection with said water heating container for supplying unrefrigerated water to said water heating container.

5. A hot and cold water dispensing unit comprising a cabinet member having in combination therein a water supply and refrigerating container in the upper portion of said cabinet, a water heating and storage container in the lower portion of said cabinet having a water supply inlet in its lower portion and a water dispensing outlet in its upper portion, a zone-defining and conduit means formed of a material of low heat conductivity and located within said supply and refrigerating container having a horizontal baffle portion dividing the space in said container into communicating horizontally disposed zones comprising a lower zone for refrigerated water and an upper zone for unrefrigerated supply water, said conduit means leading from said unrefrigerated supply zone above said baffle portion through said refrigerating zone to connection with said water supply inlet for supplying unrefrigerated water to said water heating container.

6. In a dispensing unit for cooled and heated fluid, said unit including an upright cabinet having a front wall and heat insulating partition means dividing said cabinet into upper and lower chambers, a first reservoir located in said upper chamber, fluid supply means having a downwardly directed discharge portion located in said reservoir between the upper and lower ends thereof, a refrigerating coil extended about a lower portion of said first reservoir for cooling fluid therein, conduit means formed of a material of low heat conductivity extending upwardly in said reservoir and having the upper end thereof positioned directly below and adjacent said discharge portion, a baffle member formed as an integral part of said conduit means and extending outwardly therefrom into close proximity with the walls of said first reservoir, said baffle member being located adjacent the upper end of said conduit means for substantially separating the cooled water below the baffle member from uncooled water from said fluid supply means, a second reservoir positioned in said lower chamber adjacent said front wall, means for delivering fluid from said conduit means to second reservoir, means operatively associated with said second reservoir for heating the fluid therein, and faucet means mounted on said front wall and associated with said reservoirs.

References Cited in the file of this patent

UNITED STATES PATENTS

| | | |
|---|---|---|
| 1,702,560 | Ebinger | Feb. 19, 1929 |
| 2,767,960 | Fast | Oct. 23, 1956 |
| 2,784,879 | Fischer | Mar. 12, 1957 |